US010162571B2

United States Patent
Takada

(10) Patent No.: US 10,162,571 B2
(45) Date of Patent: Dec. 25, 2018

(54) SYSTEMS AND METHODS FOR MANAGING PUBLIC AND PRIVATE QUEUES FOR A STORAGE SYSTEM

(71) Applicant: Hitachi, Ltd., Tokyo (JP)

(72) Inventor: Aritoki Takada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/509,476

(22) PCT Filed: Oct. 27, 2014

(86) PCT No.: PCT/JP2014/078497
§ 371 (c)(1),
(2) Date: Mar. 7, 2017

(87) PCT Pub. No.: WO2016/067339
PCT Pub. Date: May 6, 2016

(65) Prior Publication Data
US 2017/0286018 A1 Oct. 5, 2017

(51) Int. Cl.
*G06F 3/06* (2006.01)
*G06F 13/14* (2006.01)
(Continued)

(52) U.S. Cl.
CPC ............ *G06F 3/0659* (2013.01); *G06F 3/061* (2013.01); *G06F 3/0673* (2013.01);
(Continued)

(58) Field of Classification Search
USPC ...................................................... 710/36–41
See application file for complete search history.

(56) References Cited

U.S. PATENT DOCUMENTS 5,185,861 A * 2/1993 Valencia ............... G06F 9/5033
710/52
5,217,738 A * 6/1993 Ries ....................... A01N 31/02
426/102

(Continued)

FOREIGN PATENT DOCUMENTS

JP 2002-063148 A 2/2002
JP 2004-126694 A 4/2004
(Continued)

OTHER PUBLICATIONS

International Search Report and Written Opinion for PCT App No. PCT/JP2014/078497 dated Dec. 22, 2014, 11 pgs.

*Primary Examiner* — Raymond N Phan
(74) *Attorney, Agent, or Firm* — Procopio, Cory, Hargreaves & Savitch LLP

(57) ABSTRACT

A storage system includes: a controller including a plurality of processors; an interface device; and a plurality of queues associated with the interface device. The plurality of queues each store data transmitted from a processor allocated to the queue to the interface device. The plurality of queues include a private queue and a public queue. The private queue is a queue allocated with only a first processor as one of the plurality of processors, the private queue requiring no exclusion processing when data is stored, whereas the public queue is a queue allocated with two or more second processors in the plurality of processors, the public queue requiring the exclusion processing when data is stored.

9 Claims, 12 Drawing Sheets

(51) Int. Cl.
　　　*G06F 13/12*　　　(2006.01)
　　　*G06F 9/52*　　　(2006.01)
　　　*G06F 13/38*　　　(2006.01)

(52) U.S. Cl.
　　　CPC .............. *G06F 3/0683* (2013.01); *G06F 9/52* (2013.01); *G06F 13/12* (2013.01); *G06F 13/14* (2013.01); *G06F 13/385* (2013.01); *G06F 3/0613* (2013.01)

(56) References Cited

U.S. PATENT DOCUMENTS

| | | | | |
|---|---|---|---|---|
| 5,239,649 | A * | 8/1993 | McBride | G06F 9/5083 |
| | | | | 710/15 |
| 5,506,987 | A * | 4/1996 | Abramson | G06F 9/5033 |
| | | | | 718/103 |
| 5,872,972 | A * | 2/1999 | Boland | G06F 9/5033 |
| | | | | 718/102 |
| 5,889,989 | A * | 3/1999 | Robertazzi | G06F 9/5066 |
| | | | | 718/102 |
| 6,292,822 | B1 * | 9/2001 | Hardwick | G06F 8/451 |
| | | | | 718/102 |
| 6,735,769 | B1 | 5/2004 | Brenner et al. | |
| 7,937,553 | B2 * | 5/2011 | Sakaguchi | G06F 3/0608 |
| | | | | 711/170 |
| 8,578,106 | B1 | 11/2013 | Shapiro | |
| 8,595,385 | B1 | 11/2013 | Shapiro et al. | |
| 2004/0193787 | A1 * | 9/2004 | Takizawa | G06F 12/0215 |
| | | | | 711/105 |
| 2006/0259662 | A1 * | 11/2006 | Furukawa | G06F 3/0221 |
| | | | | 710/40 |
| 2008/0270733 | A1 | 10/2008 | Sakaguchi et al. | |
| 2015/0046642 | A1 * | 2/2015 | Lee | G06F 13/14 |
| | | | | 711/105 |

FOREIGN PATENT DOCUMENTS

| | | |
|---|---|---|
| JP | 2008-276326 A | 11/2008 |
| JP | 2010-128664 A | 6/2010 |

* cited by examiner

FIG. 3

| Device ID | Queue ID | Processor ID | Mode |
|---|---|---|---|
| D1 | Q1 | U1 | Private |
|  | Q2 | U2, U3 | Public |
| D2 | Q3 | U3 | Private |
|  | Q4 | U1, U2 | Public |
|  |  |  |  |

Queue management table (100), Device ID (101), Queue ID (102), Processor ID (103), Mode (104)

FIG. 4

| Processor I/O counting table — 120 | | |
|---|---|---|
| Processor ID — 121 | Device ID — 122 | I/O count — 123 |
| U1 | D1 | 431 |
| | D2 | 5 |
| U2 | D1 | 19 |
| | D2 | 189 |
| U3 | D1 | 2 |
| | D2 | 11 |
| ... | ... | ... |

FIG. 11

| Process ID (141) | Processor ID (142) | Processor utilization ratio (143) | Device ID (144) | I/O count (145) |
|---|---|---|---|---|
| 1001 | U1 | 36 | D1 | 244 |
|  |  |  | D2 | 5 |
| 1002 | U2 | 15 | D1 | 19 |
|  |  |  | D2 | 189 |
| 1003 | U3 | 44 | D1 | 2 |
|  |  |  | D2 | 11 |

Process I/O counting table (140)

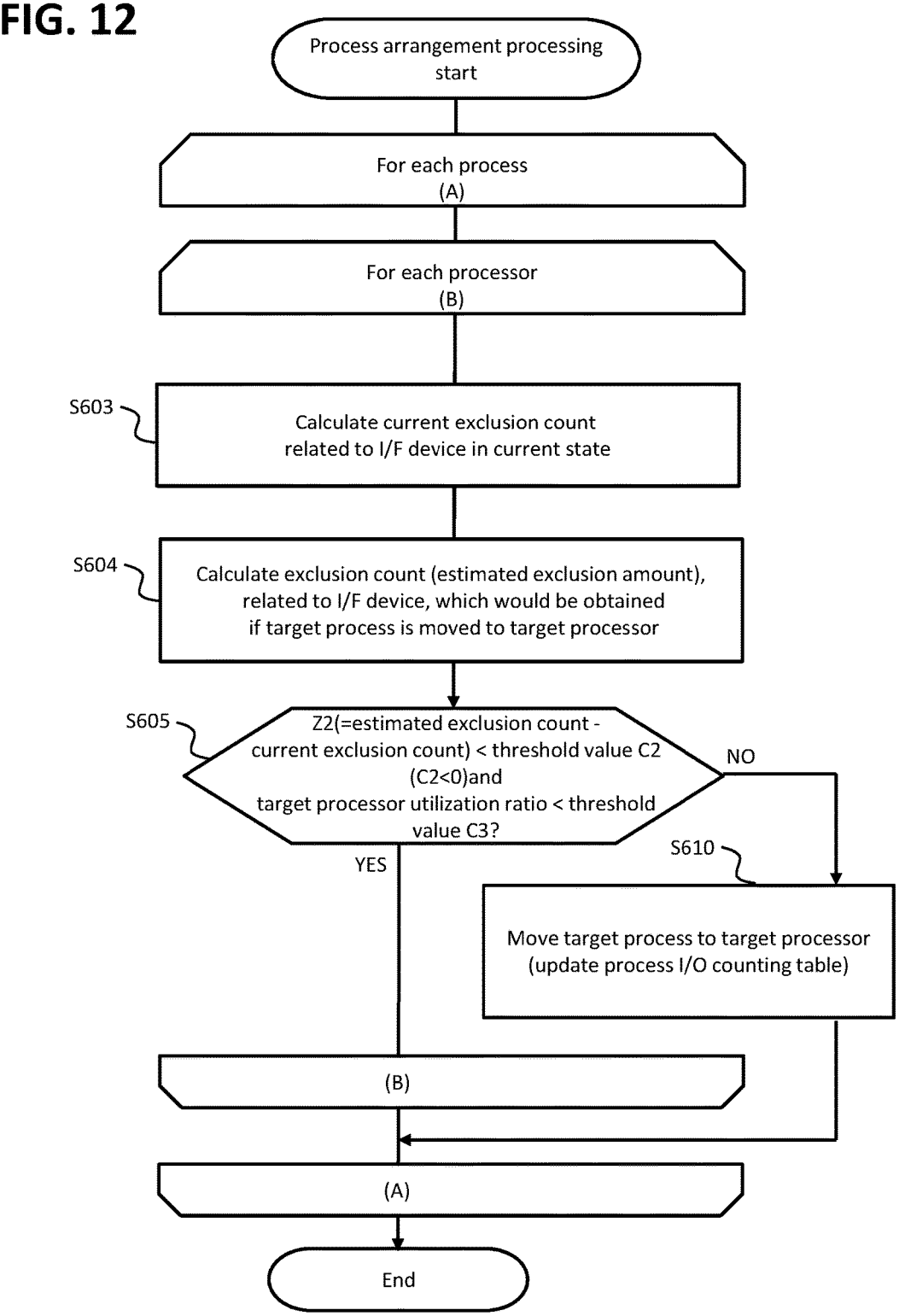

SYSTEMS AND METHODS FOR MANAGING PUBLIC AND PRIVATE QUEUES FOR A STORAGE SYSTEM

CROSS-REFERENCE TO RELATED APPLICATIONS

This application is a U.S. National Stage entry of PCT Application No: PCT/JP2014/078497 filed Oct. 27, 2014, the contents of which are incorporated herein by reference.

TECHNICAL FIELD

The present disclosure relates to a technique pertaining to a storage system and a storage control method.

BACKGROUND ART

In a storage system, a processor exchanges data with an interface (I/F) device via a queue. In a configuration where a single queue is used by a plurality of processors, the processor needs to execute exclusion processing when storing data in the queue, so that the queue can be prevented from being used by processors other than the intended processor. The exclusion processing increases a processing load on the processor, so should be used as less as possible. In this regard, techniques are available in which, in a computer including a plurality of processors, queues to be used privately by the respective processors are provided for a I/F device, so as to eliminate the need to execute the exclusion processing (PTL 1, PTL 2, and PTL 3).

CITATION LIST

Patent Literature

[PTL 1]
U.S. Pat. No. 8,595,385
[PTL 2]
U.S. Pat. No. 8,578,106
[PTL 3]
Japanese Patent Application Laid-open No. 2010-128664

SUMMARY OF INVENTION

Technical Problem

However, with this configuration of providing for an I/F device queues that are to be used privately by the respective processors (hereinafter, such a queue is referred to as a "private queue"), when the number of processors is large, the number of private queues is proportionately large and thus the amount of resources (registers and the like) used in the I/F device is also large. Thus, when the number of processors is large, there might be shortage of resources in the I/F device, which could result in the impossibility to provide the processors each with a private queue. To avoid such a situation, providing a large amount of resources in the I/F device might be conceivable, but doing so leads to a cost increase of the I/F device.

In view of the above, an object of the present invention is to provide a storage system and a storage control method with which both an amount of resources used in the I/F device and a load imposed by the exclusion processing are reduced.

Solution to Problem

A storage system according to one embodiment includes: a controller including a plurality of processors; an interface device to which a storage device is coupled; and a plurality of queues associated with the interface device, the queues including a private queue and a public queue. Each of the plurality of queues is configured to store data transmitted from a processor allocated to the queue to the interface device, and each of the plurality of queues is configured to transmit the data to the interface device. The private queue is a queue allocated with only a first processor as one of the plurality of processors, the private queue requiring no exclusion processing when data is stored. The public queue is a queue allocated with two or more second processors in the plurality of processors, the public queue requiring the exclusion processing when data is stored. The second processor is any one of the plurality of processors other than the first processor.

Advantageous Effects of Invention

The present invention can reduce both an amount of resource used by an I/F device and a load of exclusion processing.

BRIEF DESCRIPTION OF DRAWINGS

FIG. 3 illustrates an example configuration of a queue management table.
FIG. 4 illustrates an example configuration of a processor input/output (I/O) counting table.
FIG. 11 is as diagram illustrating an example configuration of a process I/O counting table.
FIG. 12 is a flowchart illustrating an example of processing for determining a processor to execute a process.

DESCRIPTION OF EMBODIMENTS

Figure 1:
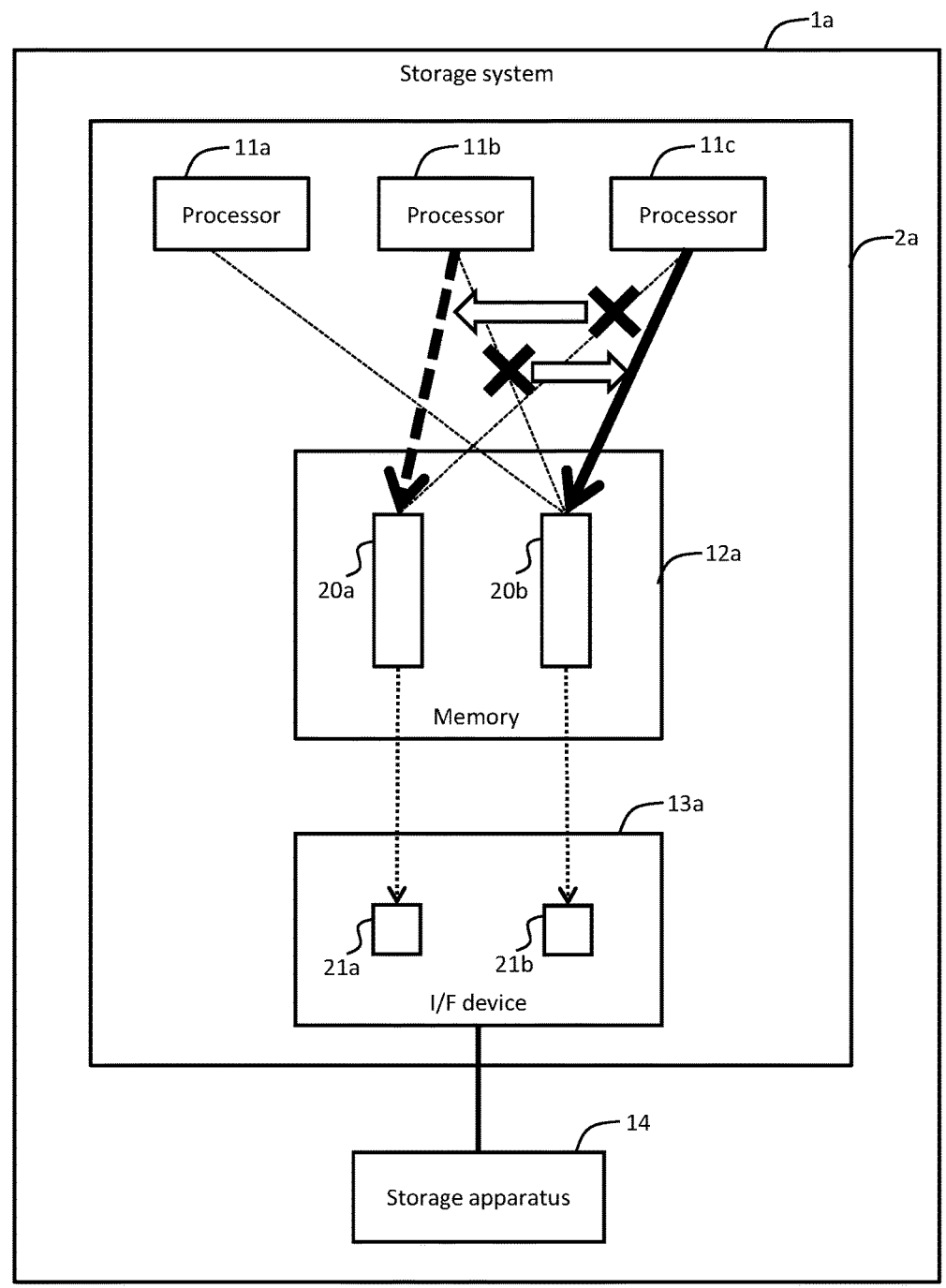
FIG. 1 illustrates an overview of an operation of a storage system according to Embodiment 1.

Embodiments are described below. In the following description, while a description may be given on some information using the expression "xxx table", the information can be expressed in any data structure. In other words, "xxx table" can be referred to as "xxx information" to indicate that the information does not depend on data structure.

In the following description, while a description may be given on processing using "xxx unit" as the subject of a sentence, such "xxx unit" may be a kind of computer program (referred to as "program"). The program is executed by a processor so that the program performs predetermined processing while using a storage resource (for example, memory) and/or a network interface device, as appropriate, so the subject which executes processing can either be a processor or an apparatus including a processor. Part or all of the processing performed by the processor may be performed by a hardware circuit (for example, ASIC (application specific integrated circuit)). The program may be installed from a program source. The program source may be a program distribution server or a storage medium (for example, portable storage medium). The processor and the memory may be collectively referred to as a controller.

In the following description, such reference numerals as "xxx1a", "xxx1b" may be used to describe the same type of elements in a distinguishable manner, whereas such common numbers as "xxx1" among reference numerals may be used to describe the same type of elements without distinguishing one element from another.

Embodiment 1

FIG. 1 illustrates an overview of an operation of a storage system 1a according to Embodiment 1.

The storage system 1a according to Embodiment 1 includes a storage apparatus 14 and a controller 2a that controls input/output of data to/from the storage apparatus 14. The controller 2a includes a plurality of processors 11 (for example 11a to 11c), a memory 12a, and an I/F device 13 (for example, 13a).

The memory 12a includes a queue 20 (for example, queues 20a and 20b) which temporarily stores therein data (an I/O request, etc.) issued by the processor 11 to the I/F device 13.

Each queue 20 is associated with the I/F device 13. The data issued from the processor 11 to the I/F device 13 is stored in the queue 20 which is associated with the I/F device 13 serving as the destination. The data stored in the queue 20 is transferred one by one (for example, FIFO) to the I/F device 13 so as to be processed.

When a plurality of queues 20 are associated with the I/F device 13, the controller 2a stores the data in any one of the queues 20. The plurality of queues associated with a single I/F device 13 includes some queues (one or two or more queues) each being a private queue 20a and the other queues (one or two or more queues) each being a public queue 20b. Thus, a single I/F device 13 is associated with at least one private queue 20a and at least one public queue 20b. The private queue 20a is a queue 20 allocated with only one of the plurality of processors 11. The processor allocated to the private queue 20a may be hereinafter referred to as a "first processor", and processors other than the first processor may be hereinafter referred to as a "second processor". The public queue 20b is a queue 20 that is allocated with at least two of all the second processors. Various associations may be employed between the public queue 20b and the second processors. For example, each of all the second processors may be allocated to each of the private queues 20b, or two or more second processors may be allocated to the first public queue 20b while two or more second processors are allocated to the second public queue 20b. The first processor and the second processor each store data in a queue that is allocated with the processor in question.

The public queue 20b may be used by two or more second processors 11 allocated thereto. Thus, when the second processor stores data in the public queue 20b, the controller 2a needs to execute exclusion processing for the public queue 20b.

There is no possibility that the private queue 20a would be used by a processor 11 other than the first processor 11. Thus, when data is stored in the private queue 20a, the controller 2a does not need to execute the exclusion processing for the private queue 20a.

When involving exclusion processing, the processing for storing data in the queue 20 requires longer time than with no exclusion processing involved, resulting in a larger processing load on the processor 11. The exclusion processing may be executed by the processor that outputs data in the controller 2a, or by a predetermined logic instead of or in addition to the processor (this logic being, for example, a processor for executing predetermined processing such as the exclusion processing, which is provided separately from those processors which transmit and receive data to and from the I/F device 13).

It may be difficult to provide the same number of private queues 20a as the number of processors 11 in the storage system. This is because a large number of queues 20 leads to a proportionately large amount of resources (for example, the number of registers 21) used in the I/F device 13, and thus the resource amount of the I/F device 13 might fall short.

Thus, the present embodiment employs the configuration described above. Specifically, the plurality of queues 20 include some queues 20 each being the private queue 20a used by a single processor only and the other queues each being the public queue 20b used by two or more processors.

Thus, the number of times the exclusion processing is executed can be reduced (that is, the load of the exclusion processing can be reduced), without providing the same number of private queues 20a as the processor 11 in the storage system (in other words, the amount of resource used by the I/F device can be reduced with the number of queues 20 associated with a single I/F device 13 being smaller than the number of processors 11). Thus, for example, the processing load on the processor 11 executing the exclusion processing can be reduced.

In FIG. 1, the private queue 20a is allocated to the processor 11c, and the public queue 20b is allocated to the processors 11a and 11b (see thin dotted lines in FIG. 1).

When the frequency of data issuing to the I/F device 13 from the processor 11b, as one of the processors 11a to 11c, reaches the maximum frequency, the following processing may be executed. Specifically, the controller 2a switches the processor allocated to the private queue 20a from the processor 11c to the processor 11b (see a bold dotted arrow in FIG. 1) and switches the queue allocated with the processor 11c from the private queue 20a to the public queue 20b (see a bold solid arrow in FIG. 1). Thus, the frequency of the data storage to the private queue 20b is lowered, whereby the number of times the exclusion processing is executed is reduced. Embodiment 1 is described below in detail.

Figure 2:
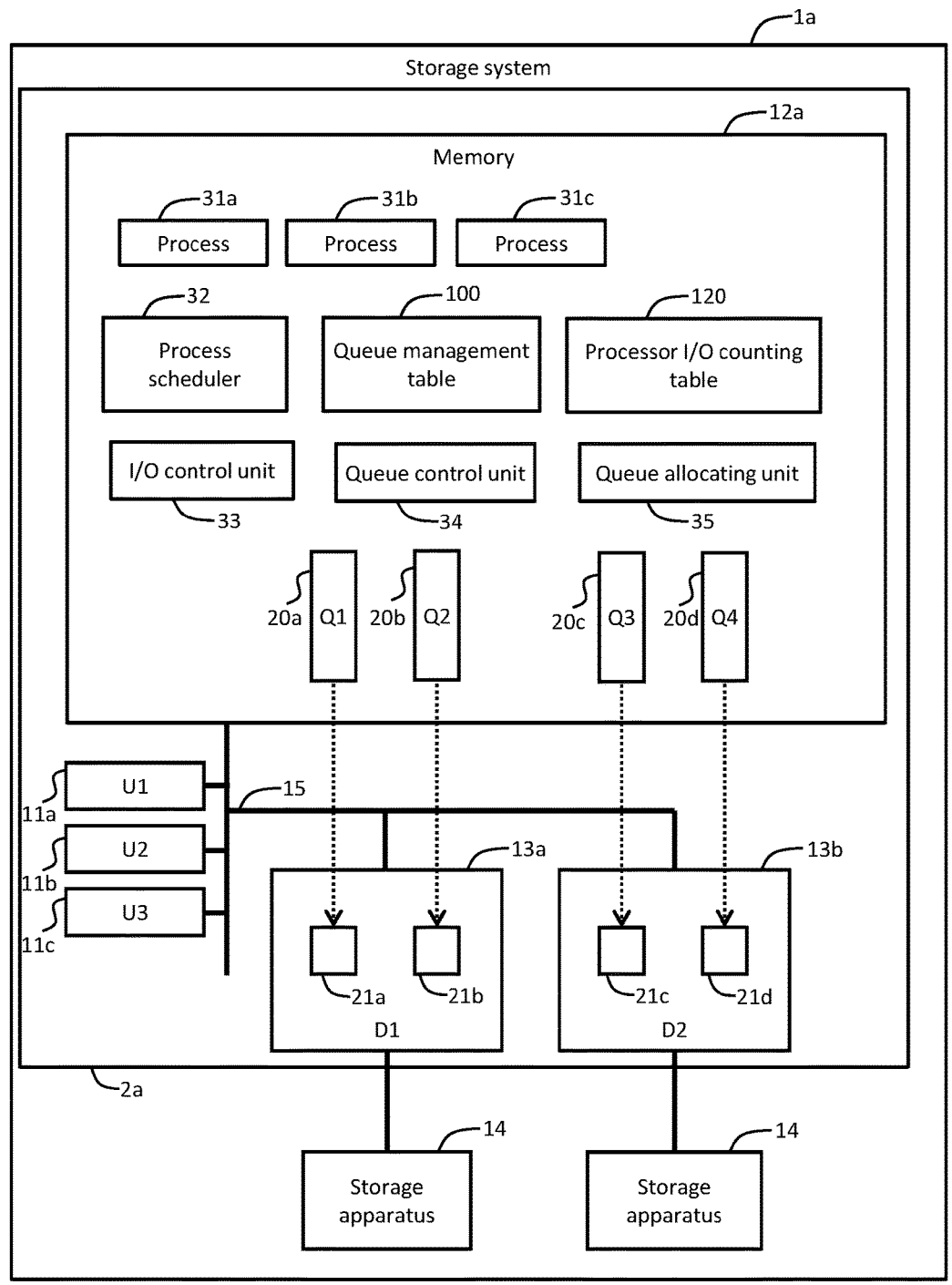
FIG. 2 illustrates an example configuration of the storage system according to Embodiment 1.

FIG. 2 illustrates an example configuration of a storage system 1a according to Embodiment 1.

The storage system 1a includes one or more storage apparatuses 14 and a controller 2a coupled to the storage apparatuses 14. The controller 2a includes a plurality of processors 11 (for example, 11a to 11c), a memory 12a, and I/F devices 13 (for example, 13a and 13b). These elements 11, 12a, and 13 are coupled to each other via an internal bus 15. With the internal bus 15, bidirectional data transmission/reception can be performed. An example of the internal bus 15 includes a PCI Express.

The I/F device 13 controls I/O between the processor 11 and the storage apparatus 14. The I/F device 13 receives data (for example, an I/O request) such as a write command, a read command, and an erase command from the processor 11, and transfers data to the storage apparatus 14. The I/F device 13 receives data such as a command result (for example, a response including a result of the I/O request) and the like from the storage apparatus 14, and transfers the data to the processor 11. An example of the I/F device 13 includes a host bus adaptor and a SATA controller. The I/F device 13 may be referred to as an I/O device. The device coupled to the I/F device 13 is not limited to the storage apparatus 14. The I/F device 13 (for example, 13a) has a resource provided with a plurality of registers 21 (for example, 21a and 21b) each associated with a corresponding one of a plurality of queues (for example 20a and 20b) associated with the I/F device 13. The register 21 is one example of a storage area provided to the resource of the I/F device 13.

The processor 11 executes a computer program stored in the memory 12a. The processor 11 transmits data, such as a command, to the I/F device 13, and receives data, such as a command result, from the I/F device 13. An example of the processor includes a CPU (central processing unit) and an LSI (large-scale integrated circuit).

The memory 12a stores therein a computer program, data, and the like accessed from the processor 11, the I/F device 13, and the like. An example of the memory 12a includes a DRAM (dynamite random access memory), an MRAM (magnetic random access memory), and an FeRAM (ferro-electric random access memory).

The memory 12a includes a queue set (plurality of queues 20) associated with the I/F device 13, for each I/F device 13. In an example illustrated in FIG. 2, the queues 20a and 20b are associated with the I/F device 13a, and the queues 20c and 20d are associated with the I/F device 13b. The number of queues 20 associated with each I/F device 13 may be smaller than the number of processors 11 that may be allocated to any of the queues 20. The number of associated queues 20 may be the same or different among all the I/F devices 13.

The memory 12a stores therein a plurality of processes 31 (for example, 31a to 31d), a process scheduler 32, an I/O control unit 33, a queue control unit 34, and a queue allocating unit 35. These elements 31 to 35 are programs that may be read and executed by the processor 11. The I/O control unit 33, the queue control unit 34, and the queue allocating unit 35 may be executed by each of the plurality of processors 11. Alternatively, the I/O control unit 33 may be executed by each of the plurality of processors 11, and at least one of the queue control unit 34 and the queue allocating unit 35 may be executed by a processor (not illustrated) other than the plurality of processor 11.

The memory 12a stores therein a queue management table 100 and a processor I/O counting table 120. These elements 100 and 120 are data that may be read and updated by the programs 31 to 35 executed by the processor 11.

The process 31 is executed by the processor 11. A single process 31 is executed by one of the plurality of processors 11.

The process scheduler 32 performs scheduling for processing time for each process 31 in each processor 11. The process scheduler 32 is provided as a function of an OS (operating system), and the process 31 may be executed on the OS.

The I/O control unit 33 controls I/O of the process 31. For example, the I/O control unit 33 analyzes a command issued from the process 31 and stores the command to a predetermined queue 20, or notifies the process 31 of a command result issued from the I/F device 13.

The queue control unit 34 controls the queue 20. When the processor 11 transmits data to an I/F device 13, the queue control unit 34 stores the data in the queue 20 associated with the I/F device 13. The queue control unit 34 executes the exclusion processing when data is stored in the public queue 20. For example, the exclusion processing is processing including: (1) checking that the public queue 20 is not locked by the other processor 11; (2) locking the public queue 20, which has been checked to be in an unlocked state, to prohibit the writing from the other processor 11; and (3) unlocking the public queue 20 once the data writing to the public queue 20 has been completed.

The queue control unit 34 executes no exclusion processing described above, when data is stored in the private queue 20. Thus, the queue control unit 34 stores the data in the private queue 20, without locking/unlocking the queue 20.

The I/F device 13 refers to its register 21, and acquires data, by FIFO, from the queue 20 associated with the register 21. Then, for example, the I/F device 13 transmits the acquired data to the storage apparatus 14.

The queue allocating unit 35 controls association between the queue 20 and the processor 11. Specifically, the queue allocating unit 35 determines a single processor 11 allocated to the private queue 20, and determines two or more processors 11 allocated to the public queue 20. Furthermore, the queue allocating unit 35 may determine ones of the plurality of queues 20 to be the private queues (public queues).

The queue management table 100 is for managing an association between the I/F device 13 and the queue 20, an association between the queue 20 and the processor 11, and a mode (the private queue or the public queue) of the queue 20. The queue management table 100 will be described in detail later (see FIG. 3).

The processor I/O counting table 120 is for managing the number of I/O requests issued from the processor 11 to the I/F device 13. The processor I/O counting table 120 will be described in detail later (see FIG. 4).

FIG. 3 illustrates an example configuration of the queue management table 100.

The queue management table 100 manages the association between the I/F device 13 and the queue 20, the association between the queue 20 and the processor 11, and the mode (the private queue or the public queue) of the queue 20. For example, the queue management table 100 includes a record for each queue 20. Each record includes device ID 101, a queue ID 102, a processor ID 103, and mode 104 as field values.

The device ID 101 is information for identifying the I/F device 13 associated with the queue 20. The queue 102 is information for identifying the queue 20. The processor ID 103 is information for identifying the processor 11 allocated to the queue 20.

The mode 104 is information indicating whether the queue 20 is "private queue" or the "public queue". The mode 104 may include an "ON" flag indicating "private" and an "OFF" flag indicating "public".

An example of the queue management table 100 illustrated in FIG. 3 indicates the following information. Specifically, the I/F device 13a corresponding to a device ID 101 "D1" is associated with the queues 20a and 20b corresponding to queue IDs 102 "Q1" and "Q2". The queue 20a corresponding to the queue ID 102 "Q1" is a "public queue" (104), and is allocated to a processor ID 103 "U1". The queue 20b corresponding to the queue ID 102 "Q2" is a "public queue" (104), and is allocated to the processors 11b and 11c corresponding to processor IDs 103 "U2" and "U3".

FIG. 4 illustrates an example configuration of the processor I/O counting table 120.

The processor I/O counting table 120 is for managing the number of I/O requests issued from the processor 11 to the I/F device 13.

The processor I/O counting table 120 includes a record for each processor 11. Each record includes a processor ID 121, a device ID 122, and an I/O count 123 as field values. The processor ID 121 and the device ID 122 are as described above with reference to FIG. 3.

The I/O count 123 indicates the number of I/O requests issued from the processor 11 to the I/F device 13 in a predetermined period. The I/O count 123 may be IOPS (input/output per second). In the I/O count 123, an I/O request related to the sequential access and an I/O request related to random access may be distinguished from each other.

The example of the processor I/O counting table 120 illustrated in FIG. 4 indicates the following information. Specifically, the processor 11a corresponding to a processor ID 121 "U1" has issued the I/O request to the I/F device 13a corresponding to a device ID 122 "D1" for "431 times" within the predetermined period. The processor 11a corresponding to the processor ID 121 "U1" has issued the I/O request to the I/F device 13b corresponding to a device ID 122 "D2" for "5 times" within the predetermined period.

Figure 5:
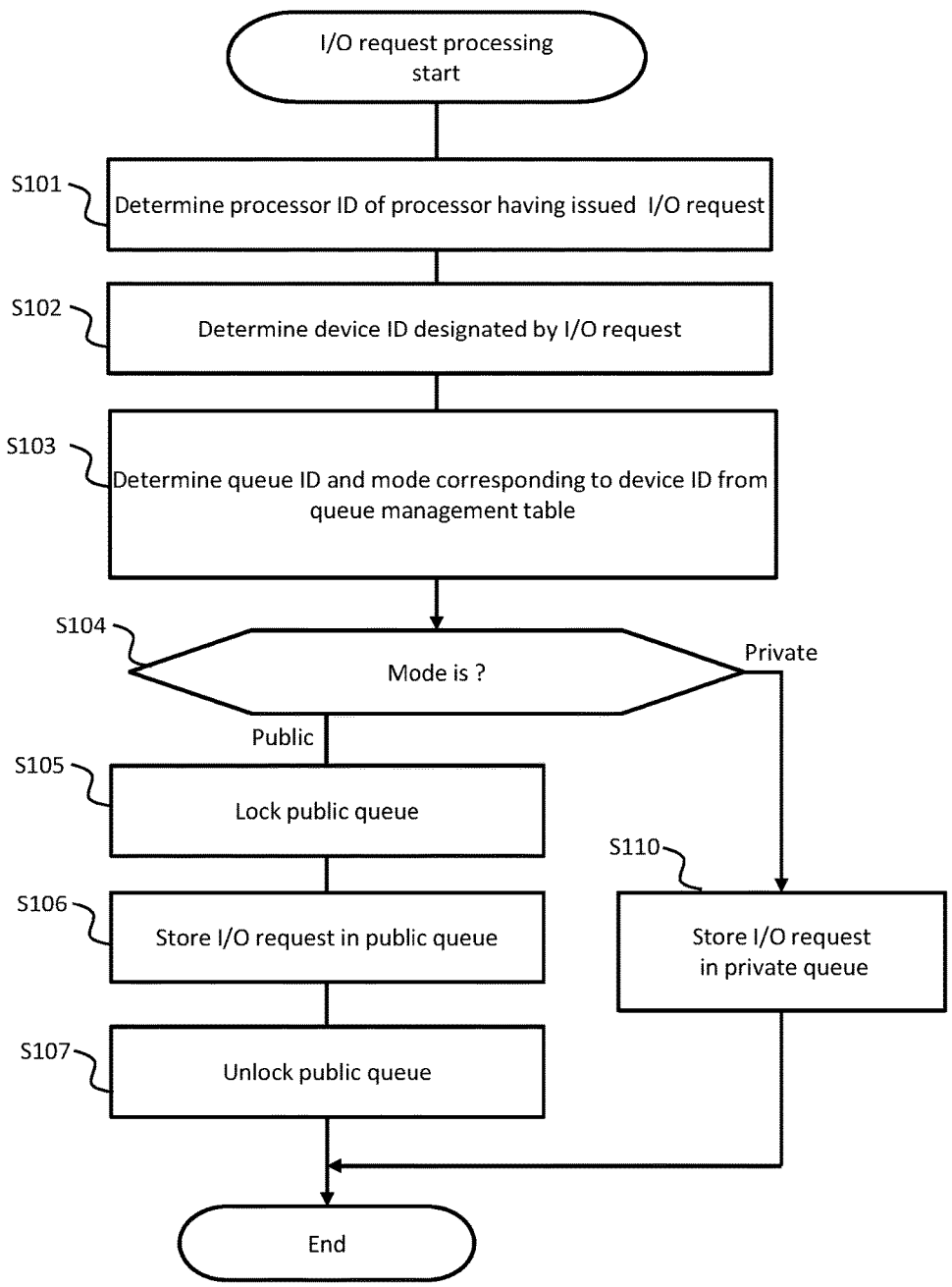
FIG. 5 is a flowchart illustrating an example of processing for storing a request in a queue.

FIG. 5 is a flowchart illustrating an example of processing for storing an I/O request in the queue 20.

The I/O control unit 33 determines the processor ID of the processor 11 that has issued an I/O request (S101). Then, the I/O control unit 33 determines the device ID of the I/F device 13 designated by the I/O request (S102).

Then, the I/O control unit 33 determines the queue ID 102 corresponding to the device ID 101, based on the queue management table 100. The I/O control unit 33 determines the mode 104 corresponding to the queue ID 102 thus acquired, based on the queue management table 100 (S103).

Then, the I/O control unit 33 determines which one of "private" and "public" is indicated by the mode 104 thus determined (S104).

When the mode 104 determined in S104 is "public" (S104: public), the I/O control unit 33 executes the following processing. Specifically, the I/O control unit 33 locks the public queue 20 corresponding to the queue ID 102 determined in S103 (S105), and then stores the I/O request in the public queue 20 (S106). Then, the I/O control unit 33 unlocks the public queue 20 (S107), and the processing is terminated. Thus, the I/O control unit 33 executes the exclusion processing on the public queue 20.

When the mode acquired in S104 is "private" (S104: private), the I/O control unit 33 stores the I/O request in the private queue 20 (S111), and the processing is terminated. Thus, the I/O control unit 33 executes no exclusion processing on the private queue 20. Thus, the processing load on the processor 11 is smaller in the case where the private queue 20 is used, compared with the case where the public queue 20 is used.

Figure 6:
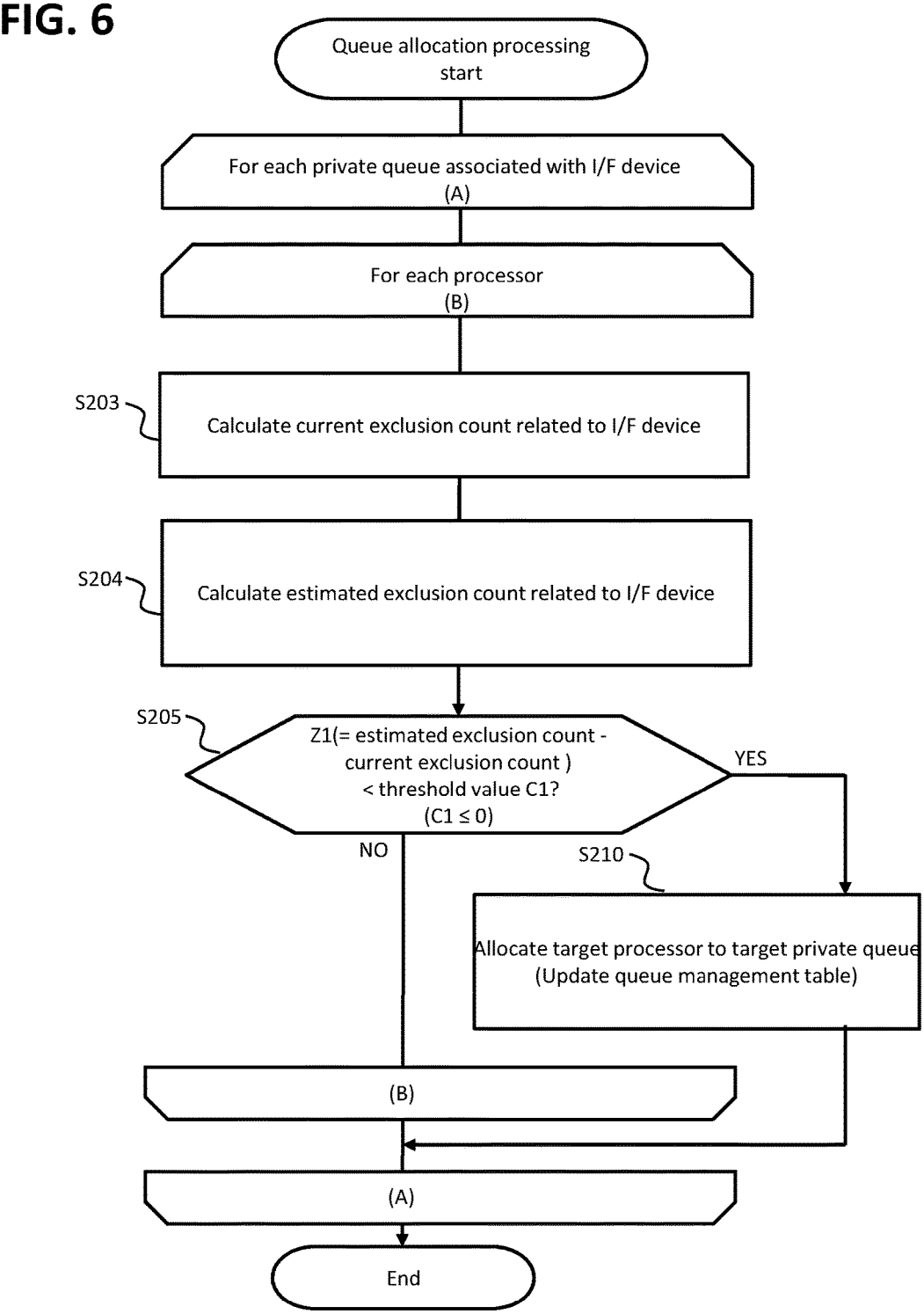
FIG. 6 is a flowchart illustrating an example of processing for determining a processor to be allocated to a private queue.

FIG. 6 is a flowchart illustrating an example of processing for determining which one of the private queues 20 is to be allocated to the processor 11.

The processing is an example where the number of queues, in the plurality of queue 20 associated with the I/F device 13, to be used as the private queues has been determined, and an example of processing executed on a single I/F device 13. When the storage system 1a includes a plurality of I/F devices 13, the processing is executed on each of the I/F devices 13. The following description, with reference to FIG. 6, is given with a single I/F device 13 as an example, and the I/F device 13 is referred to as a "target I/F device".

The queue allocating unit 35 executes processing in loop A for each private queue 20. The description is given below with processing in a single loop A as an example, and a private queue 20 as a target of the processing in the loop A is referred to as a "target private queue". Which one of the plurality of queues 20 associated with the target I/F device 13 is the private queue can be recognized by referring to the device ID 101 and the mode 104 in the queue management table 100.

In the processing in the loop A, the queue allocating unit 35 executes processing in a loop B for each processor 11. The description is given below with a processing in a single loop B as an example, and the processor 11 as a target of the processing in the loop B is referred to as a "target processor".

The queue allocating unit 35 refers to the processor I/O counting table 120, and calculates a current exclusion count related to the target I/F device 13 (S203). The exclusion count counted in this step is referred to as "current exclusion count".

The exclusion count indicates the number of times the exclusion processing has been executed when the I/O request, issued from the processor 11, is stored in the queue 20 associated with the target I/F device 13. Thus, the exclusion count is not incremented when the I/O request is stored in the private queue 20, and is incremented when the I/O request is stored in the public queue 20. The current exclusion count related to the target I/F device 13 may be the sum of the I/O counts 123 corresponding respectively to all the public queues 20 associated with the target I/F device 13. Furthermore, the exclusion count may be regarded as a frequency of storing the I/O request in the public queue 20, and thus may be referred to as a "public frequency".

The current exclusion count is counted as follows. Specifically, for example, as illustrated in the queue management table 100 in FIG. 3, the target I/F device 13a corresponding to the device ID 101 "D1" is associated with the private queue 20a corresponding to the queue ID 102 "Q1" and the public queue 20b corresponding to the queue ID 102 "Q2". The private queue 20a is allocated with the processor 11a corresponding to the processor ID 103 "U1". The public queue 20b is allocated with the processors 11b and 11c corresponding to the processor ID 103 "U2" and "U3". As illustrated in the processor I/O counting table 120 in FIG. 4, the I/O count 123, from the processor 11a corresponding to the processor ID 121 "U1" to the I/F device 13a corresponding to the device ID 122 "D1", is "431 times", the I/O count 123, from the processor 11b corresponding to the processor ID 121 "U2" to the I/F device 13a, is "19 times", and the I/O count 123, from the processor 11c corresponding to the processor ID 121 "U3" to the I/F device 13a, is "2 times". In this case, the current exclusion count related to the target I/F device 13a is the sum of I/O counts 123 from the processors 11b and 11c allocated to the public queue 20b, that is, "19+2=21".

Then, the queue allocating unit 35 calculates (estimates) the exclusion count related to the target I/F device for a hypothetical case where the target processor 11 is allocated to the target private queue (S204). The exclusion count calculated in this step is referred to as an "estimated exclusion count".

The current exclusion count is counted as follows. Specifically, for example, when the private queue 20a is allocated with the processor 11b, the processor 11a that has originally been allocated to the private queue 20a would be allocated to the public queue 20b. Thus, the estimated exclusion count related to the I/F device 13a (device ID "D1") is a sum of the I/O counts 123 of the processor 11a (processor ID "U1") and the processor 11c (processor ID "U3") that would be allocated to the public queue 20b, that is, "431+2=433".

Next, the queue allocating unit 35 determines whether a difference Z1, between the estimated exclusion count and the current exclusion count, is smaller than a predetermined threshold value C1 (C1 being a value that is 0 or less) (S205). Thus, the queue allocating unit 35 determines whether "Z1 (=estimated exclusion count−current exclusion count)<threshold value C≤0" holds true.

When a result of the determination in S205 is affirmative (S205: YES), the queue allocating unit 35 allocates the target processor 11 to the target private queue, instead of the processor that has been allocated to the target private queue (S210). Thus, the queue allocating unit 35 executes processing of updating the processor ID 103, in a record in which the queue ID 102 matches the target private queue, with the target processor 11, in the queue management table 100. This is based on an idea that the exclusion count, related to the I/F device 13, is expected to be likely to be smaller when the target private queue is allocated with the target processor 11. Then, the queue allocating unit 35 terminates the processing in the loop B.

When a result of the determination is S205 is negative (S205: NO), the queue allocating unit 35 executes the following processing. The queue allocating unit 35 terminates the processing in the loop B when the processing in the loop B has been completed on all the processors 11, and repeats the processing in the loop B when the processor 11 that has not been processed is remaining. Thus, the queue allocating unit 35 maintains the processor 11 allocated to the target private queue to be the same. This is based on an idea that the exclusion count, related to the I/F device 13, is less likely to be reduced by changing the processor 11 allocated to the target private queue.

After the processing in the loop B is completed, the queue allocating unit 35 executes the following processing. The queue allocating unit 35 terminates the processing in the loop A and terminates the present processing, when the processing in the loop A has been completed on all the private queues related to the I/F device, and repeats the processing in the loop A when the private queue that has not been processed is remaining.

Figure 7:
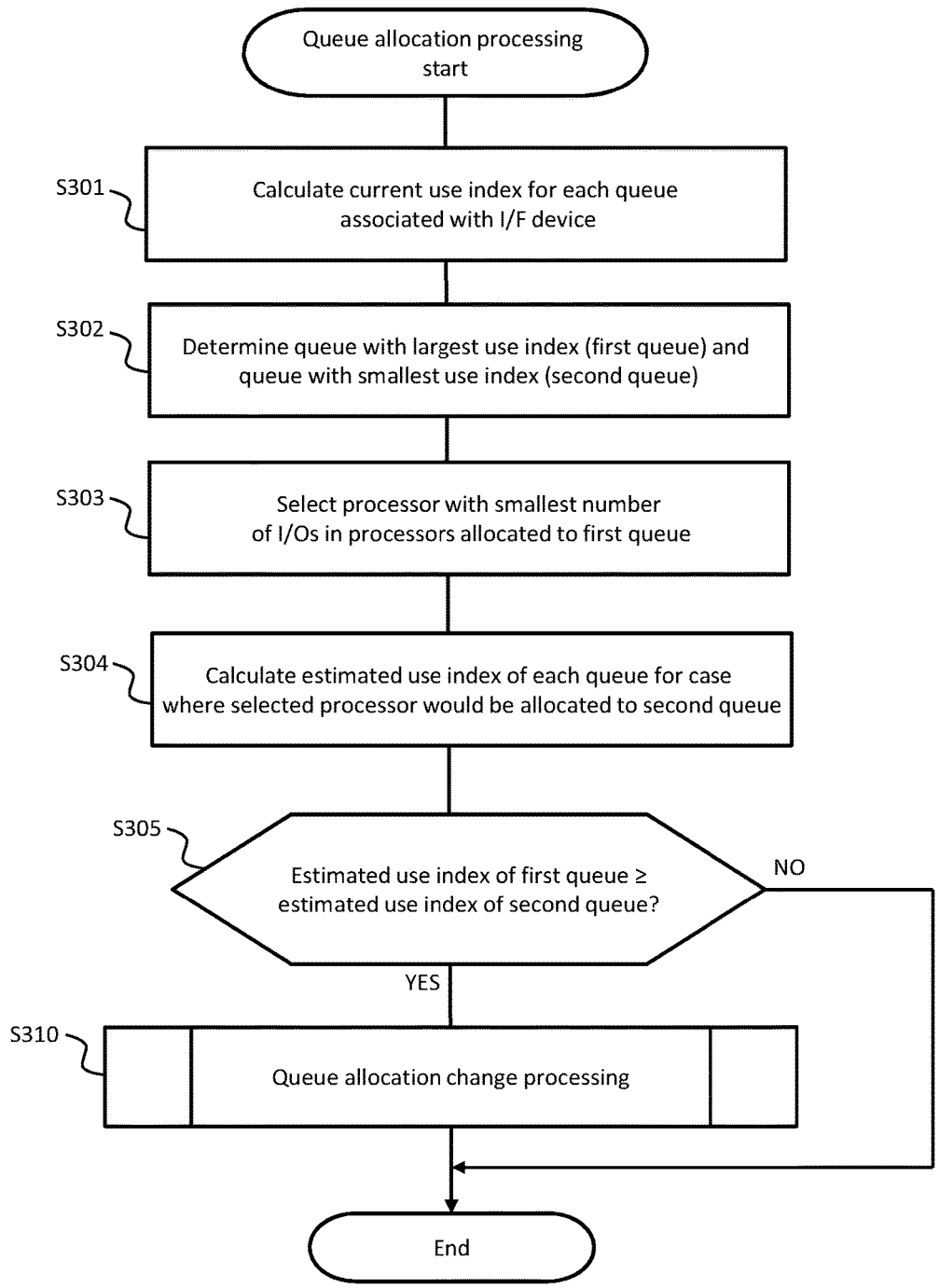
FIG. 7 is a flowchart illustrating an example of processing for determining a private queue in a plurality of queues associated with an I/F device.

FIG. 7 is a flowchart illustrating an example of processing for determining which of the plurality of queues, associated with the I/F device 13, is to be used as the private queue.

The processing is executed in an example where the number of queues, in the plurality of queues associated with the I/F device 13, to be used as the private queues has not been determined. Thus, in this processing, the number of private queues may increase/decrease as appropriate. The present processing is an example of processing on a single I/F device 13. When the storage system 1a includes a plurality of I/F devices 13, the present processing is executed on each of the I/F devices 13. The queue allocating unit 35 may execute any one of the processing illustrated in FIG. 6 and the processing illustrated in FIG. 7, or may switch between the processing illustrated in FIG. 6 and the processing illustrated in FIG. 7 at a predetermined timing. A description is given below with reference to FIG. 7, with a single I/F device 13 as an example, and this I/F device 13 is referred to as a "target I/F device".

The queue allocating unit 35 refers to the queue management table 100 and the processor I/O counting table 120, and calculates a use index of each queue 20 associated with the target I/F device (S301). The use index thus calculated is referred to as a "current use index". The use index is an index indicating how the queue 20 is used by the processor 11 (that is, a use status of the queue). The use index may be calculated based on the number of processors 11 allocated to the queue 20, and the I/O count indicating issuing to the queue 20 from each of the processors 11. The use index may be a value that increases as the I/O count indicating the issuing to the queue 20 increases. Alternatively, the use index may be a value that decreases as the number of processors 11 allocated to the queue 20 increases. For example, the use index may be a value obtained by weighting the sum of I/O counts indicating the issuing from the processors 11, allocated to the queue 20, to the queue 20 by the reciprocal of the number of processors allocated to the queue 20. Thus, the "use index" may be defined as a use load index of a single processor 11 in a single queue 20.

For example, a coefficient corresponding to a case where the number of processor 11 allocated to the queue 20 is one is "2.0", a coefficient corresponding to a case where the number of processors 11 is two is "1.5", and a coefficient corresponding to a case where the number of processors 11 is three is "1.0". As illustrated in the queue management table 100 in FIG. 3, the queue 20c corresponding to the queue ID 102 "Q3", associated with the I/F device 13b corresponding to the device ID 101 "D2", is allocated with only the processor 11c corresponding to the processor ID 103 "U3". As illustrated in the processor I/O counting table 120 in FIG. 4, the I/O count 123 indicating the number of requests issued from the processor 11c (as the processor ID 121 "U3") to I/F device 13b corresponding to the device ID 122 "D2" is "11 times". In such a case, the current use index of the queue 20c may be calculated as "2.0×11=22".

The queue 20d corresponding to the queue ID 102 "Q4", associated with the I/F device 13b corresponding to the device ID "D2", is allocated with the processors 11a and 11b corresponding to the processor ID 103 "U1" and "U2". The I/O counts 123 issued from the processors 11a and 11b to the queue 20d are "5 times" and "189 times". In this case, the current use index of the queue 20d may be calculated as "1.5×(5+189)=291".

The queue allocating unit 35 determines a queue (hereinafter, referred to as a "first queue") with the largest current use index and a queue (hereinafter, referred to as a "second queue") with the smallest current use index in the queues, from the queues (S302). The first queue can be regarded as a queue receiving a large number of I/O requests from a small number of processors 11. The second queue can be regarded as a queue receiving a small number of I/O requests from a large number of processors 11. In the example described above, the current use index of the queue 20c is "22", whereas the current use index of the queue 20d is "291". Thus, the queue allocating unit 35 determines the queue 20d as the first queue and determines the queue 20c as the second queue.

Next, the queue allocating unit 35 selects a processor 11, in the plurality of processors 11 issuing the I/O request to the I/F device 13, for which the allocated queue may be changed. For example, the queue allocating unit 35 may refer to the processor I/O counting table 120, and select the processor 11 corresponding to the smallest I/O count 123, in the plurality of processors 11 allocated to the first queue (S303). In the example described above, the queue allocating unit 35 selects the processor 11a (processor ID "U1")

corresponding to the smallest I/O count 123 from the processors 11a and 11b (processor ID "U1" and "U2") allocated to the first queue 20d (queue ID "Q4").

Next, the queue allocating unit 35 refers to the queue management table 100 and the processor I/O counting table 120, and calculates (estimates) a use index of each queue for a hypothetical case where the selected processor 11 (the processor selected in S303) is allocated to the second queue (S304). The use index thus calculated is referred to as an "estimated use index".

If the selected processor 11 were allocated to the second queue, the estimated use index of the first queue would have a larger coefficient due to the cancelling of the allocation of the selected processor 11 (reduction in the number of processors), and thus a smaller I/O count. On the other hand, the estimated use index of the second queue has a smaller coefficient due to the allocating of the selected processor 11 to the second queue (increase in the number of processors), and thus the I/O count increases.

In the example described above, if the selected processor 11a is allocated to the second queue 20c, the processors 11a and 11c (processor IDs "U1" and "U3") are allocated to the second queue 20c. Thus, the estimated use index of the second queue 20c is calculated as "1.5×(5+11)=24". On the other hand, only the processor 11b (processor ID "U2") is allocated to the first queue 20d. Thus, the estimated use index of the first queue 20d is calculated as "2.0×189=378".

Next, the queue allocating unit 35 determines whether the estimated use index of the first queue is equal to or larger than the estimated use index of the second queue (S305). Specifically, the queue allocating unit 35 determines whether a magnitude correlation between the first and the second queue in terms of the use index is reversed, if the selected processor 11 is allocated to the second queue.

When the estimated use index of the first queue is smaller than the estimated use index of the second queue (S305: NO), the queue allocating unit 35 terminates the present processing. Thus, the queue allocating unit 35 does not change the allocation of the selected processor 11 to the queue, as long as the difference in the use index does not decrease to a predetermined extent or more due to the reversing, etc., of the magnitude correlation between the first queue and the second queue in terms of the use index or the other like reasons. This is because the change is less likely to achieve a smaller number of exclusion processing executed times for the entire queues 20 associated with the I/F device 13.

When the estimated use index of the first queue is equal to or larger than the estimated use index of the second queue (S305: YES), the queue allocating unit 35 executes the queue allocation change processing (S310) and then terminates the present processing. Specifically, the queue allocating unit 35 terminates the present processing when the difference in the use index decreases to the predetermined extent or more with no reversing, etc., of the magnitude correlation between the first queue and the second queue in terms of the use index. The queue allocation change processing (S310) is described in detail later (see FIG. 8). In the example described above, the estimated use index of the first queue 20d is calculated as "378", and the estimated use index of the second queue 20c is calculated as "24". Thus, the queue allocating unit 35 executes the queue allocation change processing (S310).

Figure 8:
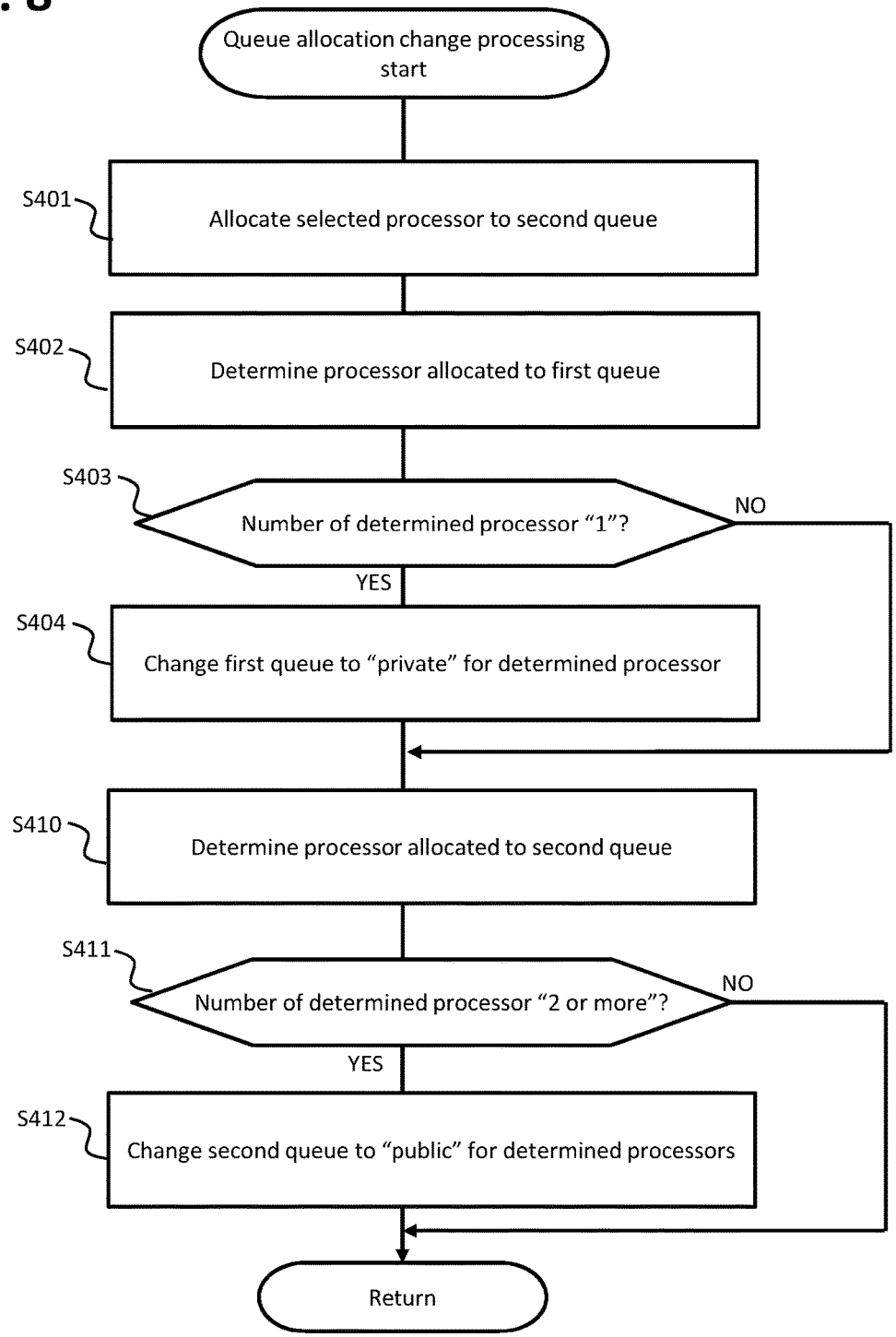
FIG. 8 is a flowchart illustrating an example of queue allocation change processing corresponding to S310 in FIG. 7.

FIG. 8 is a flowchart illustrating an example of the queue allocation change processing. This processing corresponds to S310 in FIG. 7.

The queue allocating unit 35 allocates the selected processor 11 to the second queue (S401). In the example described above, the queue allocating unit 35 changes an association between the selected processor ID 103 "U1" and the queue ID 102 "Q4" to an association between the selected processor ID 103 "U1" and the queue ID 102 "Q3" (second queue) in the queue management table 100.

Next, the queue allocating unit 35 determines the processor allocated to the first queue (S402). In the example described above, the queue allocating unit 35 determines the processor ID 103 "U2" associated with the queue ID 102 "Q4" (first queue) in the queue management table 100.

Then, the queue allocating unit 35 determines whether the number of processors allocated to the first queue is "1" (S403).

When the number of processors allocated to the first queue is not "1" (S403: NO), the queue allocating unit 35 directly proceeds to S410. Thus, the queue allocating unit 35 maintains the mode 104 of the first queue to be "public" in the queue management table 100.

When the number of processors allocated to the first queue is "1" (S403: YES), the queue allocating unit 35 changes first queue to the private queue (S404). Thus, the queue allocating unit 35 changes the mode 104 of the first queue to "private" in the queue management table 100, and then proceeds to S410.

In the example described above, the number of processors associated with the first queue 20d (the queue ID 102 "Q4") is "1" (only the processor ID "U2"). Thus, the queue allocating unit 35 changes the mode 104 of the queue ID 102 "Q4" to "private" in the queue management table 100.

Next, the queue allocating unit 35 determines the processor allocated to the second queue (S410). In the example described above, the queue allocating unit 35 determines the processor IDs 103 "U1" and "U3" associated with the second queue 20c (queue ID 102 "Q3") in the queue management table 100.

Then, the queue allocating unit 35 determines whether the number of processors allocated to the second queue is "2 or more" (S411).

When the number of processors allocated to the second queue is not "2 or more" (S411: NO), the queue allocating unit 35 terminates the present processing, and returns to the processing in FIG. 7. Thus, the queue allocating unit 35 maintains the mode 104 of the second queue to be "private" in the queue management table 100.

When the number of processors allocated to the second queue is "2 or more" (S411: YES), the queue allocating unit 35 changes the mode 104 of the second queue to "public" (S412). Then, the queue allocating unit 35 terminates the present processing, and returns to the processing in FIG. 7.

In the example described above, the number of processors associated with the second queue 20c (queue ID 102 "Q3") is "2" (the processor IDs "U1" and "U3"). Thus, the queue allocating unit 35 changes the mode 104 corresponding to the queue ID 102 "Q3" to "public" in the queue management table 100.

For example, the following description can be derived from the above description on Embodiment 1.

The controller 2a (for example, the queue control unit 34 (see FIG. 2) executed by the processor 11) controls the I/O for the queue 20 associated with the I/F device 13. The controller 2a may determine the processor 11 ("first processor") allocated to the private queue 20a based on the frequency of data issuing from each of the plurality of processors 11 to the I/F device 13. The processor 11, in the plurality of processors 11, with the highest frequency of data issuing to the I/F device 13 may be determined as the first processor. Thus, the exclusion processing is not required for data issued from the processor 11 with the highest frequency of data issuing to the I/F device 13.

When a predetermined condition related to the public frequency, as a frequency of data storing in the public queue, is satisfied, the controller 2a may execute allocation switching. Thus, the processor (the "second processor" at this point) 11 allocated to the public queue 20b is allocated to the private queue 20a instead of the processor (the "first processor" at this point) 11 that has been allocated to the private queue 20a, and the first processor is allocated to the public queue 20b instead of the second processor. In this manner, when the situation of causing the exclusion processing changes, the processor allocated to the private queue 20a can be changed.

The predetermined condition is a condition in which the estimated public frequency is lower than the current public frequency by a predetermined threshold value or more. The estimated public frequency may be a public frequency (frequency of data storage in the private queue) configured for a hypothetical case where the allocation switching processing is executed in which the second processor is allocated to the private queue 20a instead of the first processor and the first processor is allocated to the public queue 20b instead of the second processor. The current public frequency may be the public frequency before the allocation switching. Thus, when the situation causing the exclusion processing changes, the processor 11 that is more likely to involve the exclusion processing can be allocated to the private queue 20a. As a result, the number of times the exclusion processing is executed for the entire queues 20 can be reduced.

The controller 2a manages the queue type, which is either private or public, for each of the plurality of queues 20. In the public queue, data is stored after the exclusion of processing involving locking the queue. In the private queue, data may be stored with no exclusion processing. The controller 2a may repeatedly update the allocation relationship between the plurality of processors and the plurality of queues. Then, the controller 2a may change the queue type from public to private, for a queue having the number of allocated processors decreased to 1.

The controller 2a may determine whether to change the queue type from public to private, for the first queue with the largest use load index in the plurality of queues. The use load index is an index indicating the magnitude of the use load of each processor in a queue. The index may be a value decreasing as the number of processors allocated to the queue increase, and increasing as the frequency of data storage to the queue from each processor increases.

The controller 2a may estimate the use load indices of the first queue and the second queue, for a hypothetical case where allocation switching is executed in which the processor 11, in a plurality of processors 11 allocated to the first queue, with the lowest frequency of the data storage to the first queue is allocated to the second queue with the smallest use load index in the plurality of queues. When the use load index of the first queue thus estimated is larger than the use load index of the second queue thus estimated, the allocation switching of allocating the lowest processor to the second queue may be executed.

Embodiment 2

Embodiment 2 is described below. Differences from Embodiment 1 are mainly described. Points common to Embodiment 1 will not be described or will be described briefly.

Figure 9:
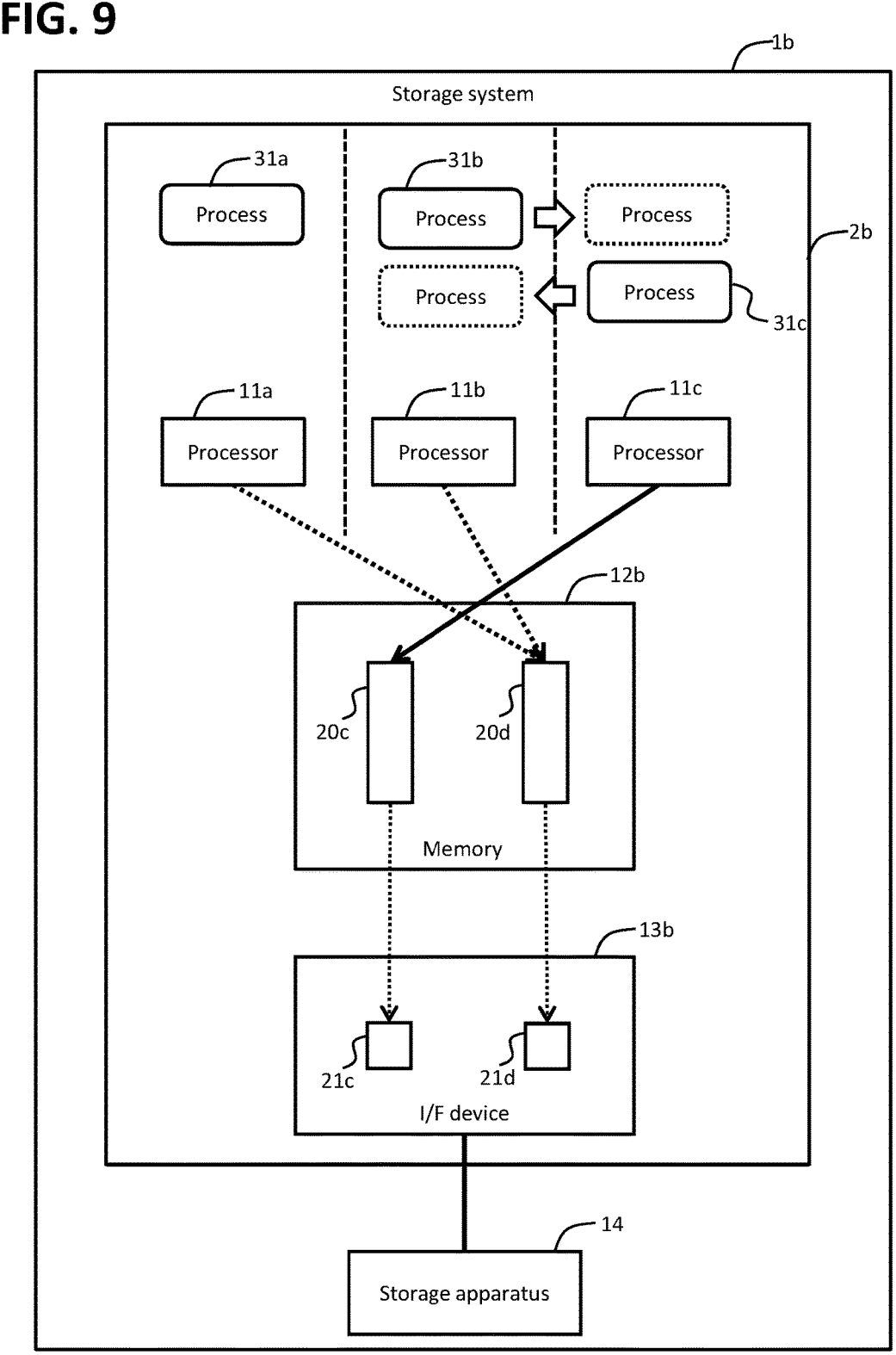
FIG. 9 is a diagram illustrating an overview of an operation of a storage system according to Embodiment 2.

FIG. 9 illustrates an overview of an operation of a storage system 1b according to Embodiment 2.

The storage system 1b according to Embodiment 2 includes: a plurality of processors 11; a memory 12b; an I/F device 13 (for example 13b); and queues 20 (20c and 20d for example). In the storage system 1b, the allocation relationship between the private queue 20 and the processor 11 is never changed. Instead, a process 31 that issues an I/O request is moved to an appropriate processor 11.

The controller 2b controls the arrangement of the processes 31 with respect to the processors 11. Data issued from a process 31 is stored in the queue 20 allocated with the processor 11 that executes the process 31. Thus, the controller 2b may determine the process 31 to be executed by the first processor 11 allocated to the private queue 20, based on the frequency of data issuing to the I/F device 13. Thus, the process 31 that is more likely to involve the exclusion processing can be executed by the processor 11 allocated to the private queue 20a. Thus, the number of times the exclusion processing is executed for the entire queues 20 can be reduced.

The controller 2b estimates the exclusion count (the number of times the exclusion processing is executed for the public queue) for a hypothetical case where process moving is executed in which at least one process 31 executed by the processor ("second processor" at this point) 11 allocated to the public queue is moved to a processor ("first processor" at this point) 11 with a load smaller than a predetermined threshold value allocated to the private queue. When the estimated exclusion count is smaller than the exclusion count before the process moving by a predetermined threshold value or more, the controller 2b may execute the process moving. Thus, when the situation causing the exclusion processing changes, the process 31 that is more likely to involve the exclusion processing can be moved to the processor 11 allocated to the private queue 20a.

In FIG. 9, the storage system 1b includes the queues 20c and 20d associated with the I/F device 13b. The queue 20c is the "private queue", and the queue 20d is the "public queue". The private queue 20c is allocated with the processor 11c. The public queue 20d is allocated with the processors 11a and 11c. The processor 11a is executing a process 31a, the processor 11b is executing the process 31b, and the processor 11c is executing the process 31c.

Then, the following processing may be executed when the frequency of data issuing from the process 31b, as one of the processes 31a, 31b, and 31c, with respect to the I/F device 13b reaches the maximum. Specifically, the controller 1b moves the process 31b to the processor 11c allocated to the private queue 20c, and moves the process 31c to the processor 11b allocated to the public queue 20d. Thus, the frequency of the data storage to the public queue 20d is reduced, whereby the number of times the exclusion processing is executed is also reduced.

Figure 10:
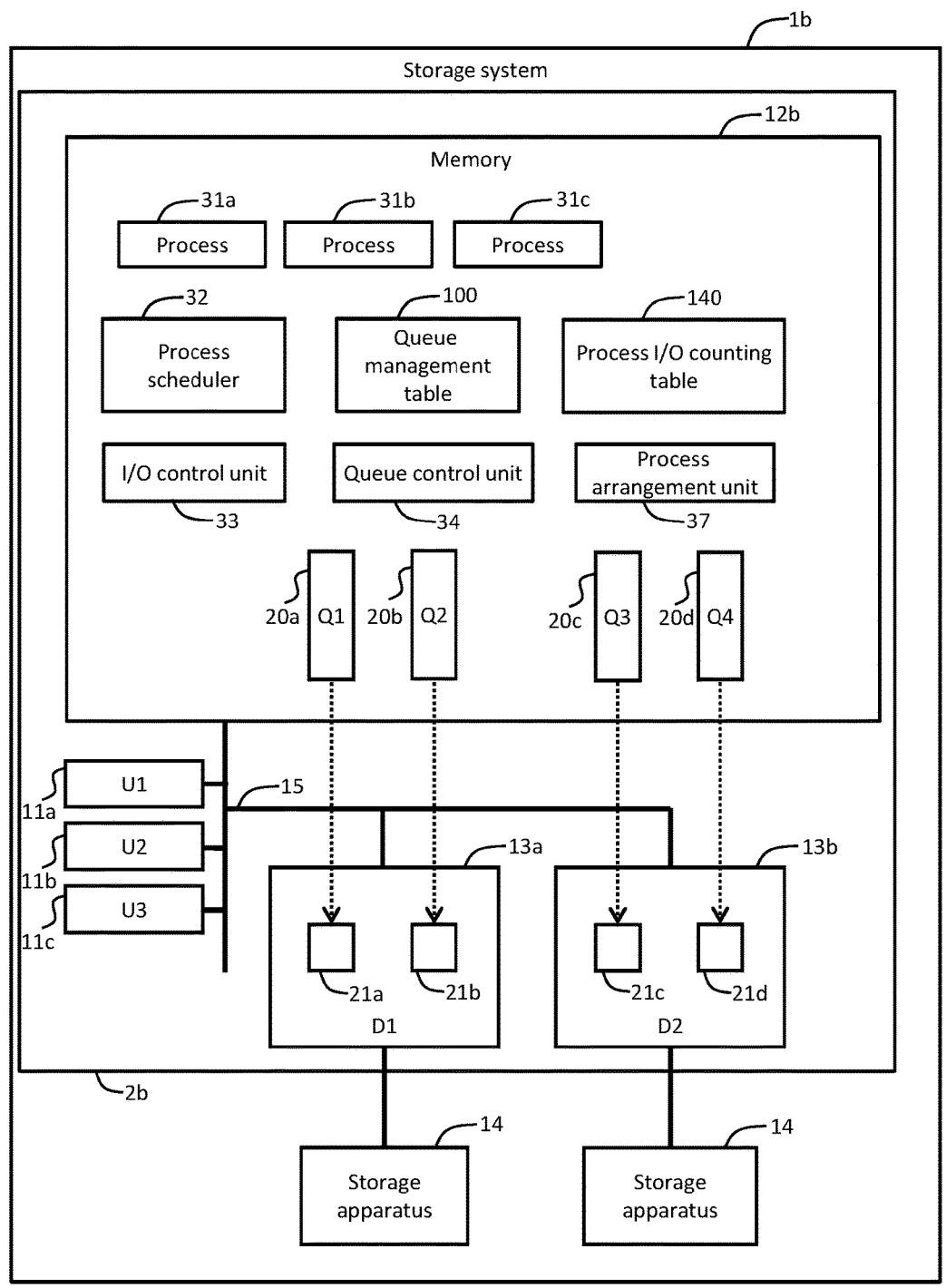
FIG. 10 is a diagram illustrating am example configuration of storage system according to Embodiment 2.

FIG. 10 illustrates an example configuration of the storage system 1b according to Embodiment 2.

The memory 12b of the controller 1b stores a process arrangement unit 37 instead of the queue allocating unit 35. The process arrangement unit 37 determines the processor 11 that executes a process 31. The process arrangement unit 37 changes the processor 11 that executes the process 31. Thus, the process arrangement unit 37 can move the process 31 executed by a certain processor 11 to another processor 11.

The processor I/O counting table 140 has a configuration different from that of the processor I/O counting table 120 according to Embodiment 1. The process I/O counting table 140 is for managing the number of I/O requests issued from the process 31 to the I/F device 13. The process I/O counting table 140 may manage the processor 11 executing the process 31 and a utilization ratio of the processor 11. The process I/O counting table 140 is described in detail later (see FIG. 11).

FIG. 11 illustrates an example configuration of the process I/O counting table 140.

The process I/O counting table 140 manages the number of I/O requests issued from the process 31 to the I/F device 13. The process I/O counting table 140 further manages the processor 11 executing the process 31 and the utilization ratio of the processor 11.

For example, the process I/O counting table 140 includes a record for each process 31, and each record includes a process ID 141, a processor ID 142, a processor utilization ratio 143, a device ID 144, and an I/O count 145 as field values.

The process ID 141 is information for identifying the process 31. The processor ID 142 and the device ID 144 are as described above with reference to FIG. 3. The I/O count 145 is as described above with reference to FIG. 4.

An example of the process I/O counting table 140 illustrated in FIG. 11 indicates the following condition. Specifically, the process 31a corresponding to a process ID 141 "1001" is executed by the processor 11a corresponding to the processor ID 142 "U1". The processor utilization ratio 143 of the processor ID 142 "U1" is "36%". The process 31 corresponding to the process ID 141 "1001" has issued an I/O request to the I/F device 13a corresponding to the device ID 144 "D1" for "244 times" (145) within a predetermined period, and has issued an I/O request to the I/F device 14b corresponding to the device ID 144 "D2" for "5 times" (145) within the predetermined period.

FIG. 12 is a flowchart illustrating an example of processing of determining the processor 11 that executes the process 31.

The present processing is executed in an example where the number of queues, in the plurality of queues 20 associated with the I/F device 13, used as the private queues is fixed. The present processing is an example of processing on a single I/F device 13. When the storage system 1b includes a plurality of the I/F devices 13, the present processing is executed on each of the I/F devices 13. A description is given below with reference to FIG. 12 with a single I/F device 13 as an example, and the I/F device 13 is referred to as a "target I/F device".

The process arrangement unit 37 executes processing in a loop A for each process 31. The processing in a loop A is described below as an example, and the process 31 as a target of the processing in the loop A is referred to as a "target process". The detail of the process being executed can be recognized by issuing an inquiry to the process scheduler 32.

In the processing in the loop A, the process arrangement unit 37 executes processing in a loop B for each processor 11. The processing in a single loop B is described below as an example, and the processor 11 as a target of the processing in the loop B is referred to as a "target processor".

The queue allocating unit 35 refers to the process I/O counting table 140, and calculates the exclusion count (current exclusion count) related to the target I/F device 13 (S603). The exclusion count is as described above with reference to FIG. 6.

The current exclusion count is calculated as follows. Specifically, for example, as illustrated in the queue management table 100 in FIG. 3, the target I/F device 13b corresponding to the device ID 101 "D2" is associated with the private queue 20c corresponding to the queue ID 102 "Q3" and the public queue 20d corresponding to the queue ID 102 "Q4". The private queue 20c is associated with the processor 11c corresponding to the processor ID "U3", and the public queue 20d is allocated with the processors 11a and 11b corresponding to the processor IDs "U1" and "U2". As illustrated in process I/O counting table 140 in FIG. 11, the I/O count 145 issued from the process 31a corresponding to a process ID 141 "1001", executed by the processor 11a (processor ID 142 "U1"), to the I/F device 13b corresponding to the device ID 144 "D2" is "5 times". The I/O count 145 issued from the process 31b corresponding to a process ID 141 "1002", executed by the processor 11b (processor ID 142 "U2"), to the I/F device 13b corresponding to the device ID 144 "D2" is "189 times". The I/O count 145 issued from the process 31c corresponding to a process ID 141 "1003", executed by the processor 11c (processor ID 142 "U3"), to the I/F device 13b corresponding to the device ID 144 "D2" is "11 times". Thus, the current exclusion count related to the target I/F device 13b is the sum of I/O counts 145 of the processes 31a and 31b executed by the processors 11a and 11b allocated to the public queue 20d is "5+189=194".

Next, the process arrangement unit 37 calculates the exclusion count (estimated exclusion count) related to the target I/F device 13, that would be obtained if the target process 31 is moved to the target processor 11 (S604).

The current exclusion count is calculated as follows. Specifically, for example, if the process 31b were moved from the processor 11b to the processor 11c, the queue 20c allocated with the processor 11c would be used by the processes 31b and 31c. Thus, the estimated exclusion count related to the I/F device 13b (device ID "D2") is the I/O count 145 corresponding to the process 31a (process ID "1001") executed by the processor 11a allocated to the public queue 20d, and thus is "5".

Next, the process arrangement unit 37 determines whether a difference Z2 between the estimated exclusion count and the current exclusion count is smaller than a predetermined threshold value C2 (C2 being a value not larger than 0), and whether the target processor utilization ratio 143 is smaller than a threshold value C3 (S605). Thus, whether "Z2 (=estimated exclusion count−current exclusion count)<threshold value C2≤0" and "target processor utilization ratio 143<threshold value C3" hold true is determined.

When a result of the determination in S605 is affirmative (S605: YES), the process arrangement unit 37 moves the target process 31 to the target processor 11 (S610). In this process, the process arrangement unit 37 updates the process I/O counting table 140 in such a manner that the target process ID 141 and the target processor ID are associated with each other. This is because the utilization ratio of the processor 11 as the destination of the process 31 is not very high, and the exclusion count related to the I/F device 13 is likely to be reduced by moving the process 31. Then, the process arrangement unit 37 terminates the processing in the loop B.

When the result of the determination in S605 is negative (S605: NO), the process arrangement unit 37 executes the following processing. The process arrangement unit 37 terminates the processing in the loop B when the processing in the loop B has been completed on all the processors 11, and repeats the processing in the loop B when the processor 11 that has not been processed is remaining. Thus, the process arrangement unit 37 maintains the current state of the target process 31 without moving it. This is because the utilization ratio of the processor 11 as the destination of the process 31 is too high or because the exclusion count, related to the I/F device 13, is less likely to be reduced by moving the process 31.

After the processing in the loop B is completed, the process arrangement unit 37 executes the following processing. The process arrangement unit 37 terminates the processing in the loop A and terminates the processing, when the processing in the loop A has been completed on all the processes 31, and repeats the processing in the loop A when the process 31 that has not been processed is remaining.

For example, the following description can be derived from the description on Embodiment 2 in which data can be issued due to each of a plurality of processors executing a process.

The controller 2b determines the process to be executed by the first processor allocated to the private queue, based on the plurality of data issuing frequencies corresponding to the plurality of processes. The data issuing frequency of the process indicates the frequency of issuing data from the process to the I/F device. The controller 2b may determine a process corresponding to the highest data issuing frequency of the plurality of data issuing frequencies as the process to be executed by the first processor allocated to the private queue. Thus, the exclusion processing is not required for the data issued from the process 31, featuring the highest frequency of data issuing to the I/F device 13.

The controller 2b executes the processing moving in which the process, being executed by the target second processor as any one of the second processors, to the first processor, when a predetermined condition relates to the public frequency as a frequency of data storing in the public queue and to the load of the first processor. The controller 2b may configure the predetermined condition to be a condition in which the estimated public frequency is smaller than the current public frequency by a predetermined threshold value or more, and the load of the first processor is smaller than the predetermined threshold value. The estimated public frequency may be the public frequency configured for a hypothetical case where the process moving is executed in which the process, being executed by the second processor, is moved to the first processor. The current public frequency may be the public frequency before the process moving. Thus, when the situation of causing the exclusion processing changes, the process 31 more likely to involve the exclusion processing can be executed by the processor 11 that is allocated to the private queue 20 and has a load smaller than the predetermined amount. As a result, the number of times the exclusion processing is executed for the entire queues 20 can be reduced without ignoring the load of the processor.

The embodiments described above are provided as an example for describing the present invention. Thus, there is no intention to limit the scope of the present invention to the embodiments. A person skilled in the art can implement the present invention in various ways without departing from the gist of the present invention. For example, the controller 2 may include the plurality of processors 11, and the memory 12 and the I/F device 13 may be provided outside the controller 2.

For example, the plurality of processors 11 may be a plurality of cores (multicore) in a single integrated circuit. For example, the plurality of processor 11 may be a plurality of threads in a multithread CPU.

REFERENCE SIGNS LIST 1a, 1b Storage system
11a, 11b, 11 Processor
12a, 12b Memory
13a, 13b I/F device
20a, 20b, 20c, 20d Queue

The invention claimed is:

1. A storage system comprising:
a controller configured to include a plurality of processors;
an interface device to which a storage device is coupled; and
a plurality of queues associated with the interface device, the queues being configured to include a private queue and a public queue,
each of the plurality of queues being configured to store data transmitted from a processor allocated to the queue to the interface device, and each of the plurality of queues being configured to transmit the data to the interface device,
the private queue being a queue allocated with only a single processor from the plurality of processors, and wherein exclusion processing is not conducted when data is stored in the private queue,
the public queue being a queue allocated with multiple ones of the plurality of processors other than the single processor, and wherein the exclusion processing is conducted when data is stored in the public queue, and
the controller is configured to,
in a case where allocation switching between the single processor allocated to the private queue and one of the multiple ones of the plurality of processors allocated to the public queue is executed and a public frequency for which data is stored in the public queue is smaller than before the allocation switching by a predetermined threshold value or more, execute the allocation switching.

2. The storage system according to claim 1, wherein the controller is configured to determine the single processor to be allocated to the private queue, based on a plurality of data issuing frequencies of data issuing respectively from the plurality of processors to the interface device.

3. The storage system according to claim 1, wherein data is issued due to the plurality of processors each executing a process, and
the controller is configured to execute, when a predetermined condition related to a public frequency indicating a frequency of data storage to the public queue and to a load of the single processor is satisfied, process moving in which a process executed by a target processor from the multiple ones of the plurality of processors is moved to the single processor.

4. The storage system according to claim 3, wherein the predetermined condition is a condition in which an estimated public frequency is smaller than a current public frequency by a predetermined threshold value or more, and the load of the first processor is smaller than a predetermined threshold value,
the estimated public frequency is a public frequency configured for a hypothetical case where the process moving in which the process executed by the target processor is moved to the single processor is executed, and
the current public frequency is a public frequency before the process moving.

5. A storage system, comprising:
a controller configured to include a plurality of processors;

an interface device to which a storage device is coupled, and a plurality of queues associated with the interface device, the queues being configured to each of the plurality of queues being configured to store data transmitted from a processor allocated to the queue to the interface device, and each of the plurality of queues being configured to transmit the data to the interface device;

wherein the controller is configured to manage a queue type, which is either private or public, of each of the plurality of queues, and store data in the public queue after executing, on the public queue, exclusion processing involving locking the queue, and store data in the private queue without executing the exclusion processing, the controller is configured to repeatedly update allocation relationship between the plurality of processors and the plurality of queues, and the controller is configured to change, for a queue having the number of allocated processors decreased to one, the queue type from the public to the private.

6. The storage system according to claim 5, wherein the controller is configured to determine, for a first queue which is one of the plurality of queues with a largest use load index, whether to change the queue type from the public to the private, and the use load index indicates a magnitude of a use load of each processor in a queue, and is a value that decreases as the number of processors allocated to the queue increases and increases as a data storage frequency to the queue from each processor increases.

7. The storage system according to claim 6, wherein the controller is configured to estimate a use load index of the first queue and a use load index of the second queue for a hypothetical case where allocation switching is executed in which a processor, in the plurality of processors allocated to the first queue, with a lowest frequency of data storage frequency to the first queue is allocated to a second queue, in the plurality of queues, with a smallest use load index, and the controller is configured to execute the allocation switching in which the processor with the lowest frequency is allocated to the second queue, when the use load index of the first queue estimated is larger than the use load index of the second queue estimated.

8. The storage system according to claim 7, wherein the use load index is a value based on a product of reciprocal of the number of processors allocated to a queue and a sum of data storage frequencies from the processors to the queue.

9. A storage control method for data in a storage system, the storage system including: a controller including a plurality of processors; an interface device to which a storage device is coupled; and a plurality of queues associated with the interface device, the queues including a private queue and a public queue, wherein the private queue is allocated with only single processor from the plurality of processors, wherein the public queue is a queue allocate with multiple ones of the plurality of processors other than the single processor, and the method comprising:

causing the controller, when data transmitted from a processor to the interface device is data issued from the single processor, to store the data in the private queue without executing exclusion processing, and when data transmitted from a processor to the interface device is data issued from the multiple ones of the plurality of processors, to store the data in the public queue after executing the exclusion processing;

and in a case where allocation switching between the single processor allocated to the private queue and one of the multiple ones of the plurality of processors allocated to the public queue is executed and a public frequency for which data is stored in the public queue is smaller than before the allocation switching by a predetermined threshold value or more, execute the allocation switching.

* * * * *